United States Patent Office 3,432,347
Patented Mar. 11, 1969

3,432,347
POLYMER COATING REMOVAL PROCESS
Harry Creston Mandell, Jr., Abington, Pa., and Edwin S. Roth, New Haven, Conn., assignors to Pennsalt Chemicals Corporation, Philadelphia, Pa., a corporation of Pennsylvania
No Drawing. Filed Aug. 2, 1965, Ser. No. 476,674
U.S. Cl. 134—38      2 Claims
Int. Cl. C23g *1/02;* B08b *3/08*

ABSTRACT OF THE DISCLOSURE

This patent application is directed to a process for stripping resins from metallic substrates using fluorosulfonic acid as the chemical resin stripping agent. The process will remove highly cross-linked resin coatings, such as, epoxies and urethanes, in a few minutes without corrosion of the substrate. Unsuccessful attempts to remove resins using other strong acids are described.

---

This invention relates to new compositions and methods for the removal of adherent resins from substrates and containers.

More particularly, the present invention relates to the use of anhydrous solutions of fluorosulfonic acid for the removal of resin coatings, glues, foams and encapsulating media preferably epoxy- or urethane-based.

The organic solvent compositions ordinarily used in the removal of coatings are sufficiently numerous and well-known as to make their discussion extraneous. Also well-known is the general class of alkali-based paint removing compositions. The numerous additives and improvements in this field are typified by the compositions disclosed and claimed in United States Patent 2,962,395 issued to Lewis J. Brown in 1960. Less widely used compounds for the removal of more resistant coatings include small amounts of organic acids notably formic acid, phenol or lactic acid. These are exemplified by the lactic acid formulation disclosed in United States Patent 2,418,138 issued to Howard Packer.

A major portion of the demand for more effective coating removal agents originates in the field of air transportation, both military and civilian. Increases in the altitude and speed of aircraft, space vehicles and capsules have required exterior surface coatings with greater resistance to abrasion and high temperatures. These requirements have been met largely by the use of epoxy and urethane resins having a relatively high degree of cross linkage.

These highly cross-linked resins have themselves posed a second problem. In the maintenance of military and commercial aircraft, it is necessary to remove all exterior paint at regular intervals in order to permit close inspection of the underlying surface for defects. The solvent type of commercial paint stripper is almost entirely ineffective in removing these new coatings. Certain of the alkaline removers are effective against the less resistant epoxy coatings, but none remove the highly cross-linked coatings with sufficient efficiency to permit their commercial adoption. The most active of the organic acid-type paint removers barely soften these films.

In the course of the development of the present invention, a number of strong acids were applied to supported films of epoxy and urethane resins. Many strong acids were found to attack these resistant paints, but every such acid also caused severe corrosion of the metallic substrate. Among the acids which were found to remove the coating but also to objectionably attack the substrate were concentrated aqueous chromic acid, glacial acetic acid, chlorosulfonic acid, concentrated sulfuric acid, concentrated phosphoric acid, trichloracetic acid, ethane sulfonic acid, concentrated aqueous hydrofluoric acid and benzene sulfonic acid. With every one of these acids the removal of the coating was slow, requiring between two and twenty-four hours for stripping of the most resistant films.

The present invention eliminates all of the above-mentioned problems and permits the rapid removal of the most resistant commercially-available epoxy and urethane paints without corrosion of the substrate. These valuable effects are obtained by the use of anhydrous formulations containing an ingredient never before used in paint removers. This new ingredient is fluorosulfonic acid.

At room temperature, fluorosulfonic acid is a liquid. It is usually produced commercially by the combination of anhydrous hydrogen fluoride with sulfur trioxide. It boils at about 165° C. and is commercially available in a purity of about 97.5% $HSO_3F$. When contacted with water it dissociates into sulfuric and hydrofluoric acids. Anhydrous fluorosulfonic acid when used in this specification and claims refers to $HSO_3F$ containing not more than 2.5% by weight water.

Fluorosulfonic acid alone, or in suitable formulations containing even as little as 0.5% by weight $HSO_3F$, rapidly attacks epoxy, polyurethane and conventional coatings, degrading the supported film so that it can easily be rinsed off completely by a stream or agitated bath of liquid. At the same time, fluorosulfonic acid alone and in proper formulations is virtually non-corrosive to steel, aluminum and magnesium (the metallic substrates most commonly employed in aircraft) and to many other substrate materials.

Highly resistant commercial paint films which have been stripped from aluminum or magnesium with anhydrous (97.5% or greater) $HSO_3F$ include—

Epoxy primers and systems such as:
    Douglas Aircraft Co. FR epoxy primer
    Boeing BMS 10–11 epoxy primer plus epoxy topcoat Polyurethane systems including those prepared according to:
    MIL–P–27316 and to
    MIL–C–27227

Enamel systems such as that prepared according to:
    MIL–E–7729

Lacquer systems such as that prepared according to:
    MIL–L–7178

The most powerful commercially available strippers barely softened the first three coatings after several hours exposure. Fluorosulfonic acid completely removed each of the above coatings in two minutes or less.

The utility of fluorosulfonic acid for removing epoxy, urethane and other resins is not restricted to films, but readily extends to the removal of foams, glues, and solid masses of these resins. The removal of foams from sandwich-type panels is illustrated by Example 5. The removal of glue from a lap joint between two aluminum sheets is illustrated by Example 6.

It should also be noted that fluorosulfonic acid is capable of removing a great many resins less chemically resistant than the highly cross-linked epoxies and polyurethanes which are the principal subject of the invention. For example, fluorosulfonic acid removes, in a brief time, alkyds, lacquers, varnishes and the large majority of those resins which are in everyday commercial use. The effect of fluorosulfonic acid on each of more than a dozen commercially available resins is shown in Example 7.

As will be apparent to those skilled in the art, one of the most substantial advantages afforded by the present invention is its ability to remove resins without harm to substrates which are comparatively susceptible to corrosion. Of major commercial significance is the surprising lack of attack on aluminum, and magnesium. Attack on steel is surprisingly low. Copper is only slightly etched even after 24 hours immersion.

The following data will serve to illustrate and support the above statements. In so doing, they will demonstrate that the present invention goes well beyond the mere use of a strong acid to remove polymerized resins and embodies the use of an agent having a unique balance between the corrosivity necessary to remove highly resistant coatings and the gentle action required to leave easily corroded metals unharmed.

United States Government specification MIL–R–25134 outlines the standard procedure used for measuring the effect of paint stripping agents on substrates. This specification requires that 1″ by 2″ test panels of substrate materials be immersed in paint strippers for seven days at 100° F. The loss in weight of a number of panels used with the present invention is given below.

TABLE I

| Recipe | Weight loss, 7 days 100° F. (gms.) | | | |
| --- | --- | --- | --- | --- |
|  | 24S, Aluminum | 2S, Aluminum | Steel | Magnesium |
| 1% (wt.) $HSO_3F$ in $CH_2Cl_2$ | 0.0009 | 0.0004 | 0.0020 |  |
| 10% (wt.) $HSO_3F$ in $CH_2Cl_2$ | 0.0001 | 0.0005 | 0.0032 |  |
| 5% $HSO_3F$ (vol.), 35% $C_6H_5SO_2F$, 60% $CH_2Cl_2$ | 0.0000 | 0.0001 | 0.0000 |  |
| 5% $HSO_3F$ (vol.), 15% $C_6H_5SO_2F$, 80% $CH_2Cl_2$ | +0.0002 | 0.0000 | +0.0002 |  |
| 30% $HSO_3F$ (vol.), 30% $(ClC_2H_4)_2O$, 40% $ClC_2H_4Cl$ | 0.0000 | 0.0000 | +0.0002 | 0.0001 |
| $HSO_3F$ (97.5% assay) | 0.0000 | 0.0000 | 0.0050 |  |

Less formal tests on copper strips indicate some darkening after immersion for one hour and only slight etching after 24 hours. Thus, all commercially practical uses of the invention are applicable to copper substrates provided that the resin employed is such that it will be capable of removal by short exposure to the stripping agent.

From the foregoing disclosures, it will be understood that the method of the present invention is capable of removing from surfaces adherent resins of a wide variety of chemical compounds, including the great majority of commercially available coating materials, foams, encapsulating compounds, and glues. Because of their wide commercial use, and the ability of the compositions of the present invention to readily remove them, resins of the following compositions are particularly suited for the practice of the present invention: epoxies, urethanes, phenolics, polycarbonates, polyesters, acrylics, neoprenes, silicon elastomers, nylons, polyvinyl chlorides, polyvinyl fluorides, and copolymers of the above.

By urethanes is meant resins which are based on polymerized ethyl carbamate. By phenolics is meant resins made from phenols, including phenol, m-cresol, p-cresol, resorcinol, and similar compounds; and generally produced by condensation with an aldehyde including formaldehyde, acetaldehyde, benzaldehyde, and furfuraldehyde. By acrylics is meant resins formed by the polymerization of monomeric derivatives of acrylic acid or of alpha methyl acrylic acid or of other homologs of acrylic acid. By nylons is meant any long chain synthetic polymeric amide having recurring amide groups as an integral part of the main polymer chain. By neoprenes is meant those elastomeric type polymers which are basically polymers of chloroprene. By polyvinyl chlorides and polyvinyl fluorides is meant polymers derived substantially from vinyl chloride and vinyl fluoride, respectively. By polyester resins is meant those resins produced by the polymerization of long chain polybasic acids, including cebacic, with polyhydric alcohols including glycol and glycerine with or without simultaneous polymerization of an admixed compound such as styrene. By silicone elastomers is meant polymers built on a structure of alternate silicon and oxygen atoms with various organic groups attached to the unsaturated valences of the silicon atoms. The polymers may be cyclic, linear or cross-linked in a wide variety of molecular weights. By epoxies is meant resins produced by the polymerization of an epoxide, including such compounds as ethylene oxide and epichlorohydrin, particularly with a diphenol. By polycarbonate resins is meant those polymers which are characterized by a substantial number of —O—CO—O— groups in the molecule.

From the above mentioned modifications and extensions it will be seen that the present invention, being unrelated to any previously used stripping compositions, enjoys a wide area of novelty and utility.

The following examples will serve to make clear the significant advantages and to enable others to understand the practice of the invention. These examples are not, of course, to be taken as limiting the invention in any respect.

EXAMPLE 1

An aluminum, a magnesium, and a steel paint test panel are carefully prepared and sprayed with Douglas Aircraft Company's FR epoxy primer. The coating thickness is approximately 1 mil after baking at 200° F. for 10 minutes. All operations are performed in accordance with Douglas' detailed standards.

A second set of aluminum, magnesium and steel panels is coated by spraying with Boeing Aircraft Company's BMS 10–11 epoxy primer, followed by a coating of Boeing's BMX 10–11 epoxy topcoat for a final coating thickness of 3 mils. All operations are in accordance with Boeing's detailed specifications.

Each of the panels is suspended in a beaker, and fluorosulfonic acid at room temperature is poured over its coated surface. Every panel is stripped to bare metal in less than 120 seconds. The metal panels are rinsed immediately in methylene chloride and re-dried to show a metallic lustre, free from any indication of corrosion.

EXAMPLE 2

Aluminum, magnesium and steel panels covered with the Douglas primer as described in Example 1 are suspended at an angle in beakers. Over each panel is poured at room temperature, a mixture of 1% by weight of $HSO_3F$ in methylene chloride. The paint is removed from each panel in less than 120 seconds and the results after rinsing in methylene chloride are as described in Example 1.

EXAMPLE 3

A set of six panels prepared as described in Examples 1 and 2 is suspended at an angle in beakers and a solution composed of 5% $HSO_3F$, 35% benzene sulfonyl fluoride, and 60% methylene chloride (all by volume) is flowed over the coated surface of each. Complete removal of each coating is achieved in 120 seconds or less. The panels show the same corrosion-free surface described in Example 1 after rinsing in rapidly running water. The panels and all liquids are at room temperature throughout.

EXAMPLE 4

Three sets of panels are prepared, each set consisting of an aluminum, a magnesium and a steel panel carefully coated with the polyurethane system specified in United States Military Specifications MIL–P–27316 and MIL–C–27227.

Each panel of one set is contacted with commercial fluorosulfonic acid according to the technique described in Example 1. Each panel of a second set is similarly contacted with a mixture of 1% by weight of fluorosulfonic acid in methylene chloride.

Each panel in the third set is similarly contacted with a mixture composed of 5% $HSO_3F$, 35% benzene sulfonyl fluoride, and 60% methylene chloride (all by volume).

The coating is removed from each of the 9 panels within 120 seconds of first contact with the formulation. All panels are rinsed with running water or with methylene chloride immediately after the action is completed.

EXAMPLE 5

A sandwich panel composed of a 0.5" thickness of polyurethane foam of approximately 3 pounds/cu. ft. density, laid between two sheets of approximately 0.06" aluminum, is completely immersed in a beaker of 5% $HSO_3F$ in methylene chloride at room temperature. After 24 hours, the foam is destroyed and the resin is easily removed from the aluminum by agitation. The aluminum surfaces are bright and uncorroded after being rinsed in flowing water immediately upon withdrawal from the fluorosulfonic acid solution.

EXAMPLE 6

A strip of 24S aluminum approximately 0.03" thick is coated with a two-component epoxy glue (Miracle Adhesive Co. #428) mixed according to the manufacturer's directions. A strip of magnesium of about the same thickness is given a conversion coating of magnesium chromate and is placed over the aluminum so as to form a 0.7" wide lap joint. The assembly is baked for 0.5 hours at 120° C. On removal from the oven, the glue appears hard and cured and the strip cannot be separated by manually exerted shearing stress.

The assembly is completely immersed in commercial grade (97.5% purity) fluorosulfonic acid at room temperature for 1.5 hours. Observation during this period indicates that the excess resin protruding from the joint is rapidly dissolved and the acid is beginning to penetrate into the joint. The assembly is washed in acetone after removal from the $HSO_3F$.

It is now possible to manually shear the joint. Examination of the separated strips shows the joint has been penetrated a distance of 0.1 to 0.2 inch from each edge of the joint. The remaining epoxy has removed the chromate coating from the magnesium and the fracture has occurred at the epoxy-magnesium bond.

For commercial use, high agitation rates, longer exposure times, and elevated temperatures permit deeper penetration of glued joints.

EXAMPLE 7

A number of specimens of commercially available plastic films are treated with commercial grade fluorosulfonic acid according to the method of the present invention. The acid is applied to a spot and removal of the film is noted after one hour at room temperature followed by a water rinse with respect to the following polymers: acrylic, neoprene, nylon, polycarbonate, polyvinyl alcohol, polyvinyl chloride, silicone elastomer and silicone rubber.

EXAMPLE 8

Aluminum panels are coated with Douglas Aircraft Company's FR epoxy primer to a coating thickness between 1 and 2 mils in accordance with Douglas' specifications. The coated panels are immersed in a methylene chloride containing 0.25% fluorosulfonic acid. The epoxy primer is not removed after immersion for eight hours at room temperature.

EXAMPLE 9

Aluminum panels coated by the procedure set forth in Example 8 are immersed in methylene chloride containing 0.5% by weight fluorosulfonic acid. The epoxy coating is stripped in a two hour period.

We claim:
1. The method of stripping polymer films from substrates which comprises contacting a polymer coated substrate with anhydrous fluorosulfonic acid.
2. The method of stripping polymer films from substrates which comprises contacting a polymer coated substrate with anhydrous fluorosulfonic acid in admixture with at least one liquid organic compound selected from the group consisting of methylene chloride, 1,2-dichloroethane, benzene sulfonyl fluoride, and bis(beta-dichloroethyl)ether in which mixture the said fluorosulfonic acid concentration varies from 0.5 to 97.5% by weight.

No references cited.

LEON D. ROSDOL, *Primary Examiner.*

W. SCHULZ, *Assistant Examiner.*

U.S. Cl. X.R.

252—143, 142